United States Patent [19]

Grisar et al.

[11] 3,872,105

[45] Mar. 18, 1975

[54] DERIVATIVES OF 1,3-BENZODIOXOLE-2-CARBOXYLIC ACID

[75] Inventors: J. Martin Grisar; Roger A. Parker; Takashi Kariya, all of Cincinnati, Ohio

[73] Assignee: Richard-Merrell Inc., New York, N.Y.

[22] Filed: June 11, 1973

[21] Appl. No.: 368,723

[52] U.S. Cl.... 260/340.5, 260/217.2 A, 260/268 C, 260/293.58, 260/326.8, 424/282
[51] Int. Cl............................................. C07d 13/10
[58] Field of Search................................. 260/340.5

[56] References Cited
UNITED STATES PATENTS

| | | | |
|---|---|---|---|
| 3,553,234 | 1/1971 | Johnson et al. | 260/340.3 |
| 3,726,924 | 4/1973 | Leimgruber et al. | 260/340.5 |

*Primary Examiner*—Donald G. Daus
*Assistant Examiner*—James H. Turnipseed
*Attorney, Agent, or Firm*—William J. Stein; Eugene O. Retter; George W. Rauchfuss, Jr.

[57] ABSTRACT

Novel 1,3-benzodioxole-2-carboxylic acids, esters and amides are useful as hypolipidemic agents reducing blood lipids, particularly lipoproteins which contain cholesterol and triglycerides.

5 Claims, No Drawings

DERIVATIVES OF 1,3-BENZODIOXOLE-2-CARBOXYLIC ACID

FIELD OF THE INVENTION

This invention relates to novel derivatives of 1,3-benzodioxole-2-carboxylic acid, to their methods of preparation, and to their usefulness in the treatment of hyperlipidemic states.

BACKGROUND OF THE INVENTION

In recent years cardiovascular diseases have been one of the leading causes of death. Mortality statistics show that of the various cardiovascular diseases, atherosclerotic processes occuring in the coronary or cerebral vessels are responsible for a large majority of deaths. A strong correlation exists between elevated plasma cholesterol and triglyceride levels and the development of atherosclerotic disease. Thus, in the treatment of diseases characterized by elevated blood lipid levels, such as coronary heart disease and stroke, it is considered highly desirable to reduce plasma cholesterol and plasma triglyceride concentrations to more normal levels.

The preparation of 1,3-benzodioxole-2-carboxylic acid and its ethyl ester were initially reported by Christiansen and Dolliver, J. Am. Chem. Soc. 66, 312 (1944). Subsequent thereto, Burger and co-workers, J. Am. Chem. Soc. 71, 3307 (1949), prepared the free acid and a number of ester and amide derivatives for use as antispasmodics. Additionally, both the free acid and their aromatically halogenated derivatives, such as 5-chlorobenzo-1,3-dioxole-2-carboxylic acid, have been shown to possess plant growth-regulating activity, Hartzfeld et al., J. Org. Chem. 22, 1717 (1957) and Cavill and Ford, J. Chem. Soc. (1954), 1388.

Applicants have discovered a novel class of compounds which are useful in the reduction of blood lipoproteins containing cholesterol and various triglycerides. These compounds are substituted 1,3-benzodioxole-2-carboxylic acids and derivatives thereof.

SUMMARY OF THE INVENTION

This invention relates to novel 1,3-benzodioxole-2-carboxylic acids, esters and amides. More particularly, this invention relates to a class of substituted phenyl derivatives which are useful as hypolipidemic agents and which may be represented by the general formula:

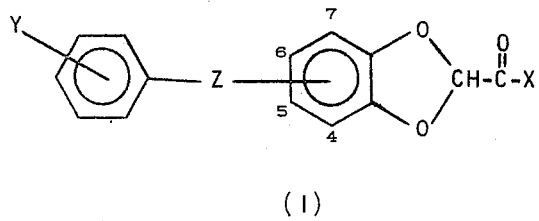

(I)

in which X is selected from the group consisting of hydroxy, lower alkoxy having from one to four carbon atoms, and the amino radical —$NR_1R_2$, wherein each $R_1$ and $R_2$ is selected from the group consisting of hydrogen or a lower alkyl radical having from one to four carbon atoms, and which when taken together with the nitrogen atom to which they are attached form a saturated monocyclic heterocyclic group selected from the pyrrolidino, piperidino, morpholino, piperazino or N-(lower alkyl)piperazino group of radicals; Y is selected from the group consisting of hydrogen, halogen, lower alkyl having from one to four carbon atoms and trifluoromethyl; Z is selected from the group consisting of a sigma bond, oxygen, lower alkylidene having from one to six carbon atoms, cycloalkylidene having from four to six carbon atoms and which when taken together with and adjacent to the group Y is selected from the group of cyclic radicals consisting of —$(CH_2)_3$—, —$(CH_2)_4$— and —$(CH_2)_5$—; and the pharmaceutically acceptable acid addition salts thereof.

The compounds of the present invention are prepared by reacting an alkali salt of a substituted pyrocatechol with two or more equivalents of a dihaloacetic acid or alkali salt thereof in an alcoholic solvent. Generally, temperatures of 80°–120°C. are utilized and the reaction continued for a period of time ranging from 24 to 120 hours.

A variety of compositions are also included within the scope of the present invention.

DETAILED DESCRIPTION OF THE INVENTION

The compounds of Formula (I) above all share a 1,3-benzodioxole-2-carboxylic acid nucleus in common. The carboxylic acid function can be further derivatized to obtain biologically equivalent, pharmaceutically acceptable salts, esters or amides. The instant compounds also share in common an additional phenyl radical or a substituted phenyl radical on the aromatic moiety of the 1,3-benzodioxole nucleus.

Pharmaceutically acceptable salts of the compounds of Formula (I), wherein X represents the hydroxyl radical, include those formed with any suitable inorganic or organic bases. Illustratively they include those of alkali metals, as for example sodium and potassium, alkaline earth metals such as calcium and magnesium, light metals of group III A including aluminum, and organic primary, secondary and tertiary amines, as for example, cyclohexylamine, ethylamine and pyridine. These salts can be prepared by conventional means such as contacting and neutralizing a solution of the 1,3-benzodioxole-2-carboxylic acid in a polar solvent with a stoichiometric quantity of a base such as sodium hydroxide.

The various esters of the present invention are delineated when the symbol X represents the lower alkoxy group. The term lower alkoxy includes various radicals having from 1 to 4 carbon atoms and specifically includes such members as the methyl, ethyl, propyl, isopropyl, butyl, sec.-butyl and t-butyl radicals.

The various amides are delineated when the symbol X represents the amino radical —$NR_1R_2$. Thus, when $R_1$ and $R_2$ are both hydrogen, the primary amides of the present invention are defined. N-substituted secondary amides are delineated where $R_1$ represents hydrogen and $R_2$ is a lower alkyl radical, in which the term lower alkyl represents those radicals previously enumerated as in the case of the esters above. N-disubstituted tertiary amides are defined where both $R_1$ and $R_2$ represent lower alkyl radicals which may be the same or different. Additionally, tertiary amides may be present in the form of saturated, monocyclic, heterocyclic radicals selected from the pyrrolidino, piperidino, morpholino, piperazino and N-(lower alkyl)-piperazino group of radicals.

The terminal substituted phenyl radical is linked to the 1,3-benzodioxole portion of the molecule in a variety of ways by the bridging function represented by the symbol Z. Due to the symmetry of the molecule this bridging function may be attached in only one of two positions on the benzodioxole nucleus, i.e., the terminal portion of the molecule may be either a 4 or a 5-substituted 1,3-benzodioxole derivative. The simplest structure is obtained when Z represents a sigma bond. The expression "sigma bond" refers to the ordinary single bond linkage between two adjacent carbon atoms, which results from the overlap of their corresponding orbitals. Thus, when the symbol Z represents a sigma bond, the terminal phenyl or substituted phenyl radical is linked directly to the 1,3-benzodioxole nucleus in either the 4 or the 5-position. When the symbol Z represents oxygen, the corresponding substituted or unsubstituted phenyl ethers are obtained.

The terminal substituted or unsubstituted phenyl radical may also be linked to the 1,3-benzodioxole nucleus via an alkylidene bridge. Thus, the expression lower alkylidene represented by the symbol Z includes members having from one to six carbon atoms. This lower alkylidene bridge includes both straight alkylidene chains and branched alkylidene chains as for example, methylene, alkylmethylenes such as n-propylmethylene, dialkylmethylenes such as diethylmethylene, ethylene, alkylethylenes such as methylethylene, dialkylethylenes such as dimethylethylene, trimethylethylene, tetramethylethylene, propylene, etc. In each instance the total number of carbon atoms encompassed by the expression lower alkylidene is equal to or less than six.

These alkylidene members can also exist in a cyclized form or as an alicyclic radical having from four to six carbon atoms. Thus, where the symbol Z represents the expression "cycloalkylidene," the cyclobutylidene, cyclopentylidene, and cyclohexylidene radicals are delineated. Finally, from a structural point of view, the aliphatic bridging group, Z, can be viewed as attached to two adjacent positions on the benzene ring to form an aromatic-alicyclic derivative of the 1,3-benzodioxole nucleus. Thus, when the group Z is taken together with and adjacent to the group Y there are represented a group of cyclic radicals consisting of $-(CH_2)_3-$, $-(CH_2)_4-$ and $-(CH_2)_5-$. More particularly, these aromatic-alicyclic derivatives represent both the substituted and unsubstituted ring radicals: 1-indanyl, 1-tetrahydronaphthyl and 1-benzocycloheptyl.

The various substituents on the terminal phenyl radical which are included within the scope of the present invention are represented by the symbol Y. All of these substituents are mono-substituted, but they may be substituted in any position of the terminal phenyl ring. Substituents include halogen, a member of the group of lower alkyl radicals and the trifluoromethyl radical. The term halogen includes the fluoro, chloro, bromo and iodo radicals, whereas the term lower alkyl represents those radicals previously enumerated by the symbol X for the esters described above. When the symbol Y represents hydrogen the ring is unsubstituted.

The subclass of substituted 1,3-benzodioxole derivatives in which the symbol Z represents a lower alkyl group having from one to six carbon atoms are potent hypolipidemic agents. These compounds are readily prepared by condensing an excess of a dihaloacetic acid with an appropriately substituted pyrocatechol, as subsequently described in more detail.

Illustrative specific base compounds encompassed by Formula (I) above include 5-(4-chlorophenyl)-1,3-benzodioxole-2-carboxylic acid ethyl ester, 5-phenoxy-1,3-benzodioxole-2-carboxylic acid, 5-(p-tolyloxy)-1,3-benzodioxole-2-carboxamide, N,N-dimethyl-5-(3-trifluoromethylphenoxy)-1,3-benzodioxole-2-carboxamide, 5-(α-methylbenzyl)-1,3-benzodioxole-2-carboxylic acid, N-methyl-5-phenethyl-1,3-benzodioxole-2-carboxamide, 1-[5-(α,α-dimethylbenzyl)-1,3-benzodioxole-2-carbonyl]piperidine, 4-[5-(4-phenyl-2-methyl-2-butyl)-1,3-benzodioxole-2-carbonyl]morpholine, 1-methyl-4-[5-(1-phenyl-1-cyclopentyl)-1,3-benzodioxole-2-carbonyl]piperazine, 5-(4-phenyl-3-ethyl-3-butyl)-1,3-benzodioxole-2-carboxylic acid sec.-butyl ester, 5-(1-phenyl-1-cyclohexyl)-1,3-benzodioxole-2-carboxylic acid, 5-(α,α-dimethyl-4-isopropylbenzyl)-1,3-benzodioxole-2-carboxylic acid methyl ester, 5-(1-indanyl)-1,3-benzodioxole-2-carboxamide, 5-(1,2,3,4-tetrahydro-1-naphthyl)-1,3-benzodioxole-2-carboxylic acid, 5-[5-(5H-benzocycloheptyl)]-1,3-benzodioxole-2-carboxylic acid isopropyl ester, N-butyl-5-(4-fluoro-α,α-dimethylbenzyl)-1,3-benzodioxole-2-carboxamide, 5-(4-tert-butyl-α,α-dimethylbenzyl)-1,3-benzodioxole-2-carboxylic acid, and 5-(α-isopropylbenzyl)-1,3-benzodioxole-2-carboxylic acid.

In general the compounds of the present invention are prepared by reacting an alkali salt of a substituted pyrocatechol with two or more equivalents of a dihaloacetic acid or alkali salt thereof in an alcoholic solvent for a period of time ranging from 24 to 120 hours. This reaction is schematically illustrated as follows using the preferred dichloroacetic acid as the condensation agent:

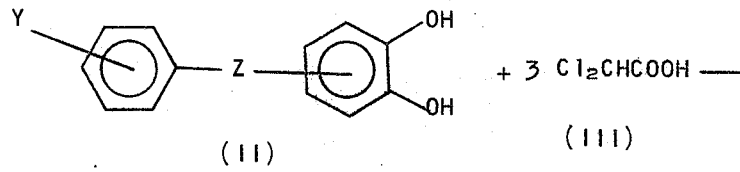

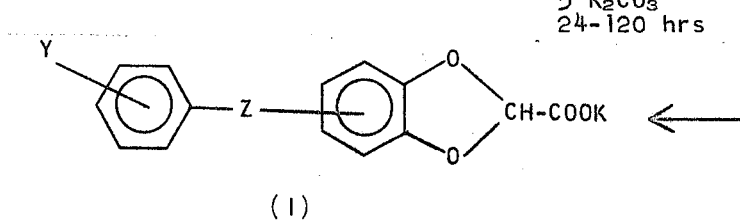

The addition or more than one mole of a dihaloacetic acid to a substituted o-hydroxyphenol (pyrocatechol) would ordinarily be expected to produce the following dihaloacetic acid ethers

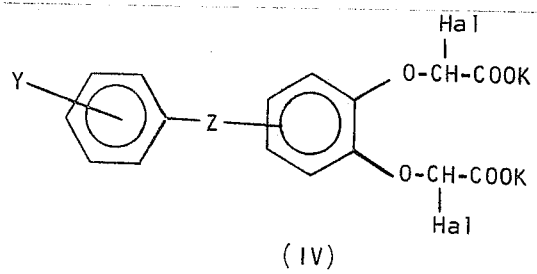

(IV)

Surprisingly, however, an excess of dihaloacetic acid results in a ring closure to form the corresponding 1,3-benzodioxole-2-carboxylic acid in good yields. Preferably, one equivalent of alkali dichloroacetate reactant is employed at the beginning of the reaction, one additional equivalent is added 24 hours later and a third equivalent is added 48 hours after the start of the reaction.

The substituted pyrocatechol salts and the salts of the dihaloacetic acid are prepared in situ by the addition of a base. A variety of bases can be used such as, for example, potassium carbonate, sodium methoxide, sodium hydride and potassium amide. Most of these bases form alkali alcoholates by reacting with the alcoholic solvent prior to the interaction with the reactants. Preferably, a two-fold excess of potassium carbonate is used as the preferred base in order to neutralize all of the phenolic and carboxylic acid functions.

The temperature at which the reaction is conducted is generally equivalent to the reflux temperature of the solvent employed, and varies from about 80° to 120°C. The reaction time varies from about 1 to about 5 days. Catalytic amounts of potassium iodide may be added to the reaction mixture if desired.

Suitable alcoholic solvents include, for example, ethanol, n-propanol, isopropanol, n-butanol and t-butanol, in addition to water and dimethylformamide and/or mixtures thereof. The preferred solvents include n-propanol and isopropanol.

Generally, after completion of the reaction the solvent is removed and replaced with water. The reaction mixture is cooled, acidified, for example, with hydrochloric acid, and the desired product removed by extraction with an appropriate solvent, such as chloroform or ethyl acetate. The residue obtained after the solvent is removed can be recrystallized from such solvents as toluene or acetic acid to yield the desired 1,3-benzodioxole-2-carboxylic acids of Formula (I), e.g., where X is hydroxyl.

Preparation of the corresponding lower alkyl esters, wherein X is lower alkoxy, is achieved by esterification of the 1,3-benzodioxole-2-carboxylic acids with lower aliphatic alcohols utilizing well known procedures.

The corresponding carboxamides may be obtained by the action of ammonia, or an appropriate primary amine such as ethylamine or propylamine, or an appropriate secondary amine such as diethylamine, diethylamine, pyrrolidine, piperidine, morpholine, piperazine or N-(lower alkyl)-piperazine, utilizing either the acid halide or the ester of the aforementioned carboxylic acids. The acid halides are obtained by reacting the carboxylic acid with thionyl chloride by generally known procedures.

The substituted pyrocatechols required as reactants are synthesized by known methods. The phenoxy substituted catechols are prepared by the Ullmann reaction which involves the condensation of a substituted phenol with an aromatic halide, such as 4-bromoveratrole, in the presence of a metallic agent, such as finely divided copper or bronze powder. The condensation is followed by removal of the protecting groups using aluminum bromide as described by Mayer and co-workers, Chem. Ber., 93, 2761 (1960) or by treatment with pyridinium chloride at elevated temperatures. The phenylalkyl, phenylcycloalkyl, indanyl, tetrahydronaphthyl and benzocycloheptyl substituted pyrocatechols are prepared by the sulfuric acid catalyzed Friedel-Crafts reaction in refluxing toluene in accordance with the procedure described by Buu-Hoi and co-workers, J. Org. Chem. 17, 243 (1952).

The compounds represented by Formula (I) above are useful as hypolipidemic agents and can be administered to animals, mammals and humans, either per se or in combination with conventional pharmaceutical carriers in dosage unit forms. The novel compounds of this invention reduce blood lipids, particularly lipoproteins containing cholesterol and triglycerides, and as such are useful in the treatment of hyperlipidemic states frequently encountered in patients with cardiovascular and atherosclerotic diseases.

Suitable dosage unit forms include oral preparations such as tablets, capsules, powders, granules, oral solutions and suspensions, sublingual and intrabuccal preparations, as well as parenteral dosage unit forms which are useful for subcutaneous, intramuscular or intravenous administration. The quantity of active ingredient administered in these dosage unit forms can vary over a wide range so as to provide from about 0.5 mg/kg to about 100 mg/kg of body weight per day. Preferably a dosage unit ranging from 10 mg/kg to 30 mg/kg of body weight per day is utilized to achieve the desired effect. Each unit dose can contain from about 50 mg to 1 g of the active ingredient in combination with a pharmaceutical carrier. Such doses can be administered, for example, from one to four times daily.

In preparing solid compositions such as tablets, the principal active ingredient is mixed with conventional pharmaceutical excipients such as gelatin, starches, lactose, magnesium stearate, talc, acacia, dicalcium phosphate and functionally similar materials. Capsules are prepared by mixing the active ingredient with an inert pharmaceutical filler or diluent and filled in either hard gelatin capsules or machine encapsulated soft gelatin capsules. Syrups or elixirs can contain the active ingredients together with sucrose or other sweetening agents, methyl and propyl parabens as preservatives, and suitable coloring and flavoring agents.

Parenteral fluid dosage forms are prepared by utilizing the active ingredient in a sterile liquid vehicle, the preferred vehicle being water or a saline solution. Compositions having the desired clarity, stability and adaptability for parenteral use are obtained by dissolving from about 0.1 mg to about 3 g of the active ingredient in a vehicle consisting of a mixture of nonvolatile liquid polyethylene glycols which are soluble in both water and organic liquids, and which have molecular weights ranging from about 200 to about 1,500. Such solutions may advantageously contain suspending agents, such as sodium carboxymethylcellulose, methylcellulose, polyvinylpyrrolidone or polyvinyl alcohol. Additionally, they may contain bactericidal and fungicidal agents, as for example, parabens, benzyl alcohol, phenol or thimerosal. If desired, isotonic agents can be included, such as glucose or sodium chloride, as well as local anesthetics, stabilizing or buffering agents. In order to further enhance stability, the parenteral compositions may be frozen after filling and water removed by freeze-drying techniques well known in the art, enabling such dry, lyophilized powders to be reconstituted immediately prior to their use.

The following preparations and examples are illustrative of the novel compounds of the present invention and their compositions, but are not to be construed as necessarily limiting the scope thereof.

EXAMPLE 1

3-Phenoxypyrocatechol

To a solution of 49.0 g (0.32 mole) of 2,3-dimethoxyphenol in 100 ml of methanol is added 22.3 g (0.32 mole) of potassium methoxide. After the initial reaction has subsided, the solvent is removed by evaporation and the residue dried at 140°C. and 0.5 mm overnight. The resulting solid is thoroughly mixed in the mortar with 30 g of finely divided copper bronze. Bromobenzene, 39.3 g (0.25 mole), is added and the mixture first ground into a paste, heated slowly to 190°–200°C. and maintained at the elevated temperature for a period of 4 hours. The reaction mixture is cooled, 2 N potassium hydroxide is added and the desired product extracted into ether. The combined ether extracts are washed with 2 N potassium hydroxide, followed by a wash with saturated sodium chloride, dried over anhydrous sodium sulfate and the solvent removed by evaporation. Vacuum distillation of the residue yielded 18.8 g of 3-phenoxyveratrole, boiling point 128°–138°C. (0.05 mm). The desired product is obtained by treating this material with 44.7 g (0.164 mole) of aluminum bromide in 200 ml of refluxing benzene. The reaction mixture is poured into a 1:1 concentrated HCl-ice mixture, the benzene layer is separated, washed with a saturated sodium chloride solution and dried over anhydrous sodium sulfate. The solvent is removed and the 3-phenoxypyrocatechol is recrystallized from cyclohexane to a product having a melting point of 68°–70°C.

EXAMPLE 2

4-(4-Chlorophenoxy)pyrocatechol

A solution of 90.0 g (0.70 mole) of $p$-chlorophenol and 49.0 g (0.70 mole) of potassium methoxide in methanol is evaporated to dryness and the residue dried at 120°–140°C. and 0.5 mm overnight. The residue so obtained is mixed in a mortar with 20.0 g of finely divided copper bronze and 102.2 g (0.47 mole) of 4-bromoveratrole. The resulting paste is heated in a flask at a temperature of 170°–185°C. for a period of 3 hours, cooled and the product is extracted with ether. The combined ether extracts are washed with a 2 N potassium hydroxide solution, followed by a saturated sodium chloride wash and dried over anhydrous sodium sulfate. The solvent is removed and (4-(4-chlorophenoxy)veratrole is obtained by distillation at 166°–175°C. (0.05 mm). To 72.4 g (0.273 mole) of this material contained in 500 ml of benzene is added a solution of 146 g (0.546 mole) of aluminum bromide contained in 500 ml of benzene. The resulting mixture is stirred at its reflux temperature for a period of 5 hours, cooled, and 1 liter of 6 N hydrochloric acid is added via dropwise addition. The benzene phase is separated, washed with a saturated sodium chloride solution, dried over anhydrous sodium sulfate and the solvent removed by evaporation. A sample of the 4-(4-chlorophenoxy)pyrocatechol so obtained when recrystallized from a mixture of benzene and cyclohexane has a melting point of 114°–116°C.

Following essentially the same procedure but substituting phenol, 3-trifluoromethylphenol, 4-ethylphenol and 2-methylphenol for the 4-chlorophenol above results in the formation of the following products, respectively: 4-phenoxypyrocatechol, melting point 100°–104°C.; 4-(3-trifluoromethylphenoxy)pyrocatechol, melting point 75°–77°C.; 4-(4-ethylphenoxy)pyrocatechol, boiling point 185°–187°C. (0.02 mm) and 4-(2-methylphenoxy)pyrocatechol, melting point 95°–97°C.

EXAMPLE 3 – 14

4-($\alpha,\alpha$-Dimethylbenzyl)pyrocatechol

To a refluxing mixture of 220.2 g (2 moles) of pyrocatechol in toluene which contains 20 ml of concentrated sulfuric acid is added via dropwise addition over a period of 70 minutes a solution of 118.2 g (1 mole) of $\alpha$-methylstyrene contained in 125 ml of toluene. The reaction mixture is refluxed for an additional hour, allowed to cool and washed with water. The toluene layer is dried over anhydrous sodium sulfate and evaporated to dryness. The residue is recrystallized from cyclohexane to give 150.4 g of the desired 4-($\alpha,\alpha$-dimethylbenzyl)pyrocatechol having a melting point of 96°–99°C.

Following essentially the same procedure but substituting the unsaturated compounds indicated below for the $\alpha$-methylstyrene, results in the formation of the following pyrocatechols, respectively:

| Example No. | Starting Material | Product | Melting Point or Boiling Point (mm) |
|---|---|---|---|
| 4 | 4-Chloro-$\alpha$-methylstyrene | 4-(4-Chloro-$\alpha,\alpha$-dimethylbenzyl)pyrocatechol | 117.5–8.0°C. |
| 5 | 4-Fluoro-$\alpha$-methylstyrene | 4-(4-Fluoro-$\alpha,\alpha$-dimethylbenzyl)pyrocatechol | 59–62°C. |
| 6 | $\alpha$,4-Dimethylstyrene | 4-(4-Methyl-$\alpha,\alpha$-dimethylbenzyl)pyrocatechol | 79–83°C.(dec.) |
| 7 | 2,4-Dimethylstyrene | 4-(2,4-Dimethyl-$\alpha$-methylbenzyl)pyrocatechol | oil |
| 8 | Styrene | 4-($\alpha$-Methylbenzyl)pyrocatechol | 77–8°C. |
| 9 | 1-Phenyl-1-pentene | 4-($\alpha$-Butylbenzyl)pyrocatechol | 99–101°C. |
| 10 | 4-Methyl-1-phenyl-1-butene | 4-($\alpha$-Isopropylbenzyl)pyrocatechol | 76–7°C.(dec.) |
| 11 | 1-Ethyl-1-phenyl-1-propene | 4-($\alpha,\alpha$-Diethylbenzyl)pyrocatechol | 90–2°C. |
| 12 | 1-Phenyl-1-cyclopentene | 4-(1-Phenyl-1-cyclopentyl)pyrocatechol | 84–8°C. |
| 13 | 1-Phenyl-1-cyclohexene | 4-(1-Phenyl-1-cyclohexyl)pyrocatechol | 77–80°C.(dec.) |
| 14 | 1-Indene | 4-(1-Indanyl)pyrocatechol | 111–3°C.(dec.) |

EXAMPLE 15 – 20

Methyl 5-Phenyl-1,3-benzodioxole-2-carboxylate

To a mixture of 100.0 g (0.537 mole) of 4-phenylpyrocatechol, and 298.0 g (2.160 moles) of potassium carbonate contained in 1.4 liters of n-propanol is added 69.5 g (0.537 mole) of dichloroacetic acid.

The mixture is stirred at its reflux temperature for 24 hours and an additional 69.5 g (0.537 mole) of dichloroacetic acid is added in dropwise fashion over a 4 hour period. The reaction mixture is maintained at its reflux temperature for a total of 4 days, at the completion of which the n-propanol is permitted to boil off while at the same time 1.5 liters of water is gradually added. On cooling the precipitate which forms is collected, washed by suspending in 1 liter of 0.2 N potassium hydroxide and again collected by filtration. The precipitate is again suspended in 1 liter of water and heated with sufficient 2 N hydrochloric acid to obtain a pH of 2. The free acid is extracted with ethanolic ether, washed with water, dried over anhydrous sodium sulfate and evaporated to dryness. The residue, containing 5-phenyl-1,3-benzodioxole-2-carboxylic acid is recrystallized from toluene to give 92.0 g of a product having a melting point of 162°–163°C. (dec.).

A portion of this acid is esterified with methanol and concentrated sulfuric acid to yield methyl 5-phenyl-1,3-benzodioxole-2-carboxylate, melting at 43°–47°C.

Following essentially the same procedure but substituting the various pyrocatechols indicated below for the 4-phenylpyrocatechol above, results in the formation of the following 1,3-benzodioxole-2-carboxylic acids and their corresponding methyl esters.

| Example No. | Starting Material | Product | Melting Point or Boiling Point (mm) |
|---|---|---|---|
| 16 | 4-Phenoxypyrocatechol | 5-Phenoxy-1,3-benzodioxole-2-carboxylic acid, methyl ester | 148–159°C. (0.02–0.03 mm) |
| 17 | 3-Phenoxypyrocatechol | 4-Phenoxy-1,3-benzodioxole-2-carboxylic acid, methyl ester | 77–9°C. |
| 18 | 4-(4-Chlorophenoxy)-pyrocatechol | 5-(4-Chlorophenoxy)-1,3-benzodioxole-2-carboxylic acid, methyl ester | 183–93°C. (0.05–0.10 mm) |
| 19 | 4-(3-Trifluoromethylphenoxy)pyrocatechol | 5-(3-Trifluoromethylphenoxy)-1,3-benzodioxole-2-carboxylic acid, methyl ester | 157–164°C. (0.04–0.07 mm) |
| 20 | 4-(2-Methylphenoxy)-pyrocatechol | 5-(2-Methylphenoxy)-1,3-benzodioxole-2-carboxylic acid, methyl ester | 162–5°C. (0.03–0.04 mm) |

EXAMPLE 21 – 32

Utilizing essentially the same procedure described in Example 15 but substituting the various pyrocatechols indicated below for the 4-phenylpyrocatechol results in the formation of the following 1,3-benzodioxole-2-carboxylic acids. The acids prepared in this manner are further esterified by refluxing with anhydrous ethyl alcohol saturated with gaseous hydrogen chloride. The following ethyl esters of 1,3-benzodioxole-2-carboxylic acids are obtained.

| Example No. | Starting Material | Product | Melting Point or Boiling Point (mm) |
|---|---|---|---|
| 21 | 4-(4-Ethylphenoxy)pyrocatechol | 5-(4-Ethylphenoxy)-1,3-benzodioxole-2-carboxylic acid, ethyl ester | 194–9°C.(0.09 mm) |
| 22 | 4-(4-Chloro-$\alpha,\alpha$-dimethylbenzyl)-pyrocatechol | 5-(4-Chloro-$\alpha,\alpha$-dimethylbenzyl)-1,3-benzodioxole-2-carboxylic acid, ethyl ester | 199–203°C.(0.06 mm) |
| 23 | 4-(4-Fluoro-$\alpha,\alpha$-dimethylbenzyl)-pyrocatechol | 5-(4-Fluoro-$\alpha,\alpha$-dimethylbenzyl)-1,3-benzodioxole-2-carboxylic acid, ethyl ester | 181–7°C.(0.30–0.40 mm) |
| 24 | 4-($\alpha,\alpha$,4-Trimethylbenzyl)-pyrocatechol | 5-($\alpha,\alpha$,4-Trimethylbenzyl)-1,3-benzodioxole-2-carboxylic acid, ethyl ester | 189–95°C.(0.04–0.05 mm) |
| 25 | 4-($\alpha$,2,4-Trimethylbenzyl)-pyrocatechol | 5-($\alpha$,2,4-Trimethylbenzyl)-1,3-benzodioxole-2-carboxylic acid, ethyl ester | 184–193°C.(0.02–0.05 mm) |
| 26 | 4-($\alpha$-Methylbenzyl)pyrocatechol | 5-($\alpha$-Methylbenzyl)-1,3-benzodioxole-2-carboxylic acid, ethyl ester | 183–7°C.(0.28–0.37 mm) |
| 27 | 4-($\alpha$-Butylbenzyl)pyrocatechol | 5-($\alpha$-Butylbenzyl)-1,3-benzodioxole-2-carboxylic acid, ethyl ester | 184–99°C.(0.35–0.50 mm) |
| 28 | 4-($\alpha$-Isopropylbenzyl)-pyrocatechol | 5-($\alpha$-Isopropylbenzyl)-1,3-benzodioxole-2-carboxylic acid, ethyl ester | 178–86°C.(0.15–0.28 mm) |
| 29 | 4-($\alpha,\alpha$-Diethylbenzyl)-pyrocatechol | 5-($\alpha,\alpha$-diethylbenzyl)-1,3-benzodioxole-2-carboxylic acid, ethyl ester | 186–94°C.(0.22–0.30 mm) |
| 30 | 4-(1-Phenyl-1-cyclopentyl)-pyrocatechol | 5-(1-Phenyl-1-cyclopentyl)-1,3-benzodioxole-2-carboxylic acid, ethyl ester | 204–8°C.(0.16–0.22 mm) |
| 31 | 4-(1-Phenyl-1-cyclohexyl)-pyrocatechol | 5-(1-Phenyl-1-cyclohexyl)-1,3-benzodioxole-2-carboxylic acid, ethyl ester | 211–6°C.(0.04–0.07 mm) |
| 32 | 4-(1-Indanyl)-pyrocatechol | 5-(1-Indanyl)-1,3-benzodioxole-2-carboxylic acid, ethyl ester | 201–8°C.(0.25–0.30 mm) |

EXAMPLE 33

Sodium 5-($\alpha,\alpha$-dimethylbenzyl)-1,3-benzodioxole-2-carboxylate

A mixture of 130.0 g (0.57 mole) of 4-($\alpha,\alpha$-dimethylbenzyl)pyrocatechol, 316.0 g (2.28 moles) of potassium carbonate and 73.5 g (0.57 mole) of dichloroacetic acid contained in 2.2 liters of propyl alcohol is stirred at its reflux temperature for a period of 6 days. Additional 73.5 g portions of dichloroacetic acid are added for 24 hours and 48 hours, respectively. After the reaction is completed, the propyl alcohol is boiled off and slowly replaced with an equal volume of water. The precipitate which forms on cooling is collected, washed with 0.2 N potassium hydroxide and converted to its acid form using a solution of hydrochloric acid. The carboxylic acid is extracted with a mixture of methylene dichloride and acetone (3:1), the combined extracts are dried over anhydrous sodium sulfate and the solvent removed by evaporation to yield 142.0 g of oil. Conversion of the 5-($\alpha,\alpha$-dimethylbenzyl)-1,3-benzodioxole-2-carboxylic acid to its sodium salt gives a compound melting at 251°–253° C. (dec.).

EXAMPLE 34

5-Phenyl-1,3-Benzodioxole-2-Carboxamide

The compound 5-phenyl-1,3-benzodioxole-2-carboxylic acid, 20.8 g (0.085 mole) prepared in accordance with Example 15 above is refluxed with 200 ml of thionyl chloride for a period of 30 minutes. The excess thionyl chloride is removed by distillation at reduced pressure, 200 ml of dry benzene added to the dark oil which remains and 300 ml of strong ammonia solution is added. The mixture is permitted to remain at room temperature with occasional stirring for 30 minutes. The crude 5-phenyl-1,3-benzodioxole-2-carboxamide so obtained is collected by filtration, washed with water, dried and crystallized from acetone to yield a product having a melting point of 185°–187°C.

EXAMPLE 35

Hypolipidemic Activity

Young male rats of the Wistar strain, initially weighing about 170 to 190 grams, were given free access to a diet containing 0.15% by weight of the test compound. This diet is prepared by thoroughly mixing the test compound with commercial laboratory animal feed, PURINA CHOW (Trademark of Ralston Purina Company, St. Louis, Mo.). Groups of animals are maintained on these diets for a period of either 4 or 10 days. Control groups of 6 rats each are given the same diet to which no test compound is added. At the end of the treatment period, all of the rats are bled by cardiac puncture, and the plasma so obtained is analyzed for its cholesterol and triglyceride content. The percent reduction in plasma cholesterol and plasma triglycerides obtained as compared to the untreated control rats in the same experiment is expressed in the last two columns of the following table.

| Test Compound | Duration of Treatment (Days) | *Daily Dose mg/kg | No. Rats | Plasma Cholesterol % Reduction | Plasma Triglycerides % Reduction |
| --- | --- | --- | --- | --- | --- |
| 5-(4-Chlorophenoxy)-1,3-benzodioxole-2-carboxylic acid, methyl ester | 4 | 108 | 6 | 21 | 73 |
| 5-(1-Phenyl-1-cyclopentyl)-1,3-benzodioxole-2-carboxylic acid, ethyl ester | 4 | 368 | 6 | 27 | 59 |
|  | 4 | 265 | 6 | 23 | 55 |
|  | 4 | 191 | 6 | 17 | 48 |
|  | 4 | 105 | 6 | 25 | 27 |
| 5-(4-Fluoro-$\alpha,\alpha$-dimethylbenzyl)-1,3-benzodioxole-2-carboxylic acid, ethyl ester | 4 | 57 | 6 | 41 | 81 |
|  | 4 | 44 | 6 | 41 | 71 |
|  | 4 | 24 | 6 | 30 | 52 |
|  | 4 | 11 | 6 | 13 | 31 |
|  | 4 | 6 | 6 | 0 | 14 |

*Daily dose administered by admixture to food. Actual dose calculated from food consumption.

EXAMPLE 36

Preparation of a capsule formulation

One thousand two-piece hard gelatin capsules for oral use each containing 100 mg of 5-(4-fluoro-$\alpha,\alpha$-dimethylbenzyl)-1,3-benzodioxole-2-carboxylic acid, ethyl ester are prepared from the following ingredients:

|  | Grams |
| --- | --- |
| (a) 5-(4-fluoro-$\alpha,\alpha$-dimethylbenzyl)-1,3-benzodioxole-2-carboxylic acid, ethyl ester | 100 |
| (b) Lactose, U.S.P. | 100 |
| (c) Starch, U.S.P. | 10 |
| (d) Talc, U.S.P. | 5 |
| (e) Calcium stearate | 1 |

The materials are mixed until uniformly dispersed and filled into hard shelled gelatin capsules of the appropriate size.

In a similar fashion one-piece soft gelatin capsules can be prepared in which the above formulation can be granulated, slugged or compressed directly into a rotary die or plate mold in which the capsule is formed. Alternatively, the above excipients may be omitted and the active ingredient dispensed directly into the capsule.

EXAMPLE 37

Preparation of a parenteral solution

A sterile aqueous suspension suitable for parenteral use is prepared from the following ingredients:

|  | Grams |
| --- | --- |
| (a) 5-($\alpha,\alpha$-dimethylbenzyl)-1,3-benzodioxole-2-carboxylic acid, sodium salt | 1 |
| (b) Polyethylene glycol 4000, U.S.P. | 3 |
| (c) Sodium chloride | 0.9 |
| (d) Polyoxyethylene derivatives of sorbitan monooleate (TWEEN 80) U.S.P. | 0.4 |
| (e) Sodium metabisulfite | 0.1 |
| (f) Methylparaben, U.S.P. | 0.18 |
| (g) Propylparaben, U.S.P. | 0.02 |
| (h) Water for injection q.s. to 100 ml |  |

The parabens, sodium metabisulfite, and sodium chloride are dissolved in approximately one-half the volume of water for injection at 80°C. with stirring. The solution is cooled to below 40°C. and the active ingredient is dissolved therein followed by the polyethylene glycol 4,000 and the polyoxyethylene derivatives of sorbitan monnoleate. The cooled solution is adjusted to the final volume with water for injection and is then sterilized by sterile filtration through a suitable filter. Each one ml of solution contains 10 mg of 5-($\alpha,\alpha$-dimethylbenzyl)-1,3-benzodioxole-2-carboxylic acid, sodium salt as the active ingredient.

We claim:

1. A 1,3-benzodioxole-2-carboxylic acid derivative having the formula:

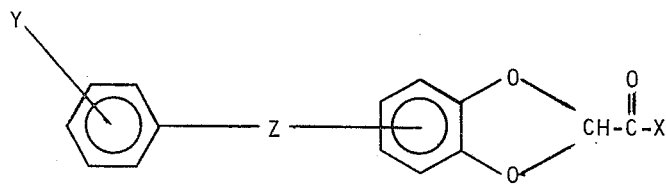

in which X is selected from the group consisting of hydroxy and lower alkoxy having from one to four carbon atoms; Y is selected from the group consisting of hydrogen, halogen, lower alkyl having from one to four carbon atoms and trifluoromethyl; Z is selected from the group consisting of a sigma bond, oxygen, lower alkylidene having from one to six carbon atoms, cycloalkylidene having from four to six carbon atoms and which when taken together with and adjacent to the group Y is selected from the group of cyclic radicals consisting of —$(CH_2)_3$—, —$(CH_2)_4$— and —$(CH_2)_5$—; and the pharmaceutically acceptable acid addition salts thereof.

2. A compound of claim 1 wherein Z is lower alkylidene having from one to six carbon atoms.

3. A compound of claim 1 which is 5-(4-fluoro-$\alpha,\alpha$-dimethylbenzyl)-1,3-benzodioxole-2-carboxylic acid, ethyl ester.

4. A compound of claim 1 which is 5-(1-phenyl-1-cyclopentyl)-1,3-benzodioxole-2-carboxylic acid, ethyl ester.

5. A compound of claim 1 which is 5-phenoxy-1,3-benzodioxole-2-carboxylic acid, methyl ester.

* * * * *